US011764402B2

(12) United States Patent
Cho et al.

(10) Patent No.: US 11,764,402 B2
(45) Date of Patent: Sep. 19, 2023

(54) ELECTROLYTIC SOLUTION FOR LITHIUM SECONDARY BATTERY, AND LITHIUM SECONDARY BATTERY COMPRISING SAME

(71) Applicant: SK On Co., Ltd., Seoul (KR)

(72) Inventors: Inhaeng Cho, Daejeon (KR); Dai In Park, Daejeon (KR); Jinhaek Yang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 368 days.

(21) Appl. No.: 16/971,703

(22) PCT Filed: Feb. 12, 2019

(86) PCT No.: PCT/KR2019/001682
§ 371 (c)(1),
(2) Date: Aug. 21, 2020

(87) PCT Pub. No.: WO2019/164164
PCT Pub. Date: Aug. 29, 2019

(65) Prior Publication Data
US 2020/0388883 A1    Dec. 10, 2020

(30) Foreign Application Priority Data

Feb. 23, 2018  (KR) .................. 10-2018-0022125
Feb. 1, 2019   (KR) .................. 10-2019-0013762

(51) Int. Cl.
| | |
|---|---|
| *H01M 10/0567* | (2010.01) |
| *H01M 4/505* | (2010.01) |
| *H01M 4/525* | (2010.01) |
| *H01M 10/0525* | (2010.01) |
| *H01M 4/02* | (2006.01) |

(52) U.S. Cl.
CPC ....... *H01M 10/0567* (2013.01); *H01M 4/505* (2013.01); *H01M 4/525* (2013.01); *H01M 10/0525* (2013.01); *H01M 2004/028* (2013.01); *H01M 2220/20* (2013.01)

(58) Field of Classification Search
CPC .. H01M 10/0567; H01M 4/505; H01M 4/525; H01M 10/0525; H01M 2004/028; H01M 2220/20
See application file for complete search history.

(56) References Cited

U.S. PATENT DOCUMENTS

| | | | |
|---|---|---|---|
| 10,355,309 B2 | 7/2019 | Ahn et al. | |
| 2008/0153005 A1* | 6/2008 | Horikawa | H01M 10/052 429/339 |
| 2011/0240913 A1 | 10/2011 | Kim et al. | |
| 2015/0364798 A1 | 12/2015 | Oshima et al. | |
| 2018/0051137 A1 | 2/2018 | Kim et al. | |
| 2018/0301756 A1* | 10/2018 | Sakaguchi | H01M 10/0568 |
| 2019/0379086 A1 | 12/2019 | Yoo et al. | |
| 2020/0251778 A1* | 8/2020 | Choi | H01M 10/0567 |

FOREIGN PATENT DOCUMENTS

| | | |
|---|---|---|
| EP | 3522287 A1 | 8/2019 |
| JP | 200225609 A | 1/2002 |
| JP | 200841296 A | 2/2008 |
| JP | 2011108454 A | 6/2011 |
| KR | 101637090 A | 7/2016 |
| KR | 1020160129585 A | 11/2016 |
| KR | 1020180016486 A | 2/2018 |
| WO | 2019027137 A1 | 2/2019 |

OTHER PUBLICATIONS

Japanese Patent Application Publication No. 2014-146517 A, Aug. 2014.
Japanese Patent Application Publication No. 2014-160575 A, Sep. 2014.
Japanese Patent Application Publication No. 2017-33838 A, Feb. 2017.
Korean Patent Application Publication No. 10-2015-0089712 A, Aug. 2015.
Korean Patent Application Publication No. 10-2016-0129584 A, Nov. 2016.

* cited by examiner

*Primary Examiner* — Matthew T Martin
*Assistant Examiner* — Taylor Harrison Krone
(74) *Attorney, Agent, or Firm* — THE WEBB LAW FIRM

(57) ABSTRACT

The present invention relates to an electrolytic solution for a lithium secondary battery, and a lithium secondary battery including the same. The lithium secondary battery according to the present invention employs the electrolytic solution for a lithium secondary battery, containing a difluorophosphite compound, according to the present invention, and thus has improved characteristics.

13 Claims, No Drawings

ELECTROLYTIC SOLUTION FOR LITHIUM SECONDARY BATTERY, AND LITHIUM SECONDARY BATTERY COMPRISING SAME

CROSS-REFERENCE TO RELATED APPLICATIONS

This application is the United States national phase of International Application No. PCT/KR2019/001682 filed Feb. 12, 2019, and claims priority to Korean Patent Application Nos. 10-2018-0022125 and 10-2019-0013762, filed Feb. 23, 2018 and Feb. 1, 2019, respectively, the disclosures of which are hereby incorporated by reference in their entirety.

TECHNICAL FIELD

The present invention relates to an electrolytic solution for a lithium secondary battery and a lithium secondary battery containing the same.

BACKGROUND ART

A lithium secondary battery already has been efficiently used as a power supply for mobile devices such as smart phones and laptop computers or for electric vehicles due to its advantages such as high energy density and low self-discharge.

The lithium secondary battery includes a lithium salt which is an electrolyte, and a non-aqueous solvent-based electrolytic solution. It is required for the non-aqueous solvent to have a high dielectric constant and high ion conductivity in a wide temperature range in order to dissolve the lithium salt.

In order to satisfy such requirements, a solvent obtained by mixing a high-boiling point solvent such as propylene carbonate or ethylene carbonate with a low-boiling point solvent such as dimethyl carbonate or diethyl carbonate has been used.

In addition, an electrolytic solution to which various additives are added has been used to improve an initial capacity, cycle characteristics, high-temperature storage characteristics, low-temperature characteristics, self-discharge characteristics, over-charging characteristics, and the like of a secondary battery.

Recently, in accordance with a change of the industrial environment to pursue eco-friendly energy, studies on a new energy source have been intensively conducted. In particular, studies have been actively conducted on a lithium secondary battery having high energy density, exhibiting a high performance, and capable of stably supplying power for use as a main power source or an auxiliary power source of an electric vehicle or a hybrid vehicle.

Accordingly, a high voltage lithium secondary battery charged to a voltage of 4.2 V or more has been developed to increase the energy density of the lithium secondary battery. As a cathode active material of the lithium secondary battery, lithium-containing cobalt oxide ($LiCoO_2$) has been mainly used, and additionally, lithium-containing manganese oxide such as $LiMnO_2$ having a layered crystal structure or $LiMn_2O_4$ having a spinel crystal structure and lithium-containing nickel oxide ($LiNiO_2$) have been also used.

In a case of a $LiNiO_2$-based cathode active material, a rapid phase transformation in a crystal structure is exhibited depending on a change in volume accompanied by a charge and discharge cycle, chemical resistance is rapidly deteriorated on a surface thereof when exposed to air and moisture, and an excessive amount of gas during storage or a cycle is generated. Thus, its practical utilization has been limited.

Therefore, a lithium transition metal oxide in which nickel is partially substituted with another transition metal such as manganese or cobalt has been proposed. Such metal-substituted nickel-based lithium transition metal oxide is relatively advantageous in terms of cycle characteristics and capacity properties; however, in this case, the cycle characteristics are also rapidly deteriorated when used for a long period of time, and some problems such as swelling due to gas generated in the battery and low chemical stability have not been sufficiently resolved. In particular, lithium nickel-based transition metal oxide with a high nickel content entails problems such as a significant battery swelling phenomenon due to an excessive amount of gas generated during storage or a cycle and low high-temperature stability.

Accordingly, in order to solve the problem in high-temperature stability while using the lithium nickel-based cathode active material suitable for a higher capacity, a measure to improve lifespan characteristic and high-temperature stability of a battery by adding vinylene carbonate, vinyl ethylene carbonate, or the like which is known in the art as an additive for an electrolytic solution to form an SEI film has been suggested.

However, when an operating voltage range is widened while using the additive for an electrolytic solution according to the related art for the high voltage lithium secondary battery as it is, internal resistance and a lifespan of a battery are rapidly reduced.

That is, in a case where a general electrolytic solution according to the related art is used, the battery characteristics are excellent at a voltage of 4.2 V or less; however, the battery performance deteriorates as the voltage is increased at the voltage of 4.2 V or more.

Therefore, development of a material for an electrolyte having excellent voltage resistance even at a high temperature may be a key element in a successful development of a high voltage cathode material.

In order to increase the energy density of the lithium secondary battery, it is required to increase capacities of materials for a cathode and an anode used in the battery or to increase a battery drive voltage. However, an electrolytic solution is oxidatively decomposed under a condition of a high voltage of 4.3 V or more to form an unstable film having inhomogeneous compositions on a surface of the cathode. The formed film is not stably maintained during repetitive charge and discharge, which induces continuous oxidative decomposition of the electrolytic solution. Such a continuous decomposition reaction causes a problem in that a thick resistive layer is formed on the surface of the cathode, and lithium ions and electrons which contribute to reversible capacity are consumed, resulting in a reduction in cathode capacity.

In addition, elution of manganese and nickel ions is induced from LNMO by HF formed through hydrolysis of a $LiPF_6$ salt in the electrolytic solution, and thus, the cathode active material is lost and the capacity is reduced. The eluted manganese ions and nickel ions move to a surface of the anode serving as a counter electrode to deintercalate lithium inserted into a graphite anode, resulting in cell capacity reduction.

Therefore, it is required to develop an additive for an electrolytic solution that may withstand a high voltage and an electrolytic solution that may suppress an increase in battery internal resistance by the additive, and an active material.

In order to solve such problems, as an example, U.S. Patent Application Publication No. 2015-0364798 discloses a cathode for a lithium secondary battery capable of withstanding high-voltage driving.

However, satisfactory results have not yet been obtained. There is still a need for a high voltage lithium secondary battery having improved lifespan characteristics and high-temperature stability without capacity reduction under a high voltage.

DISCLOSURE

Technical Problem

An object of the present invention is to provide an electrolytic solution for a lithium secondary battery having high-rate charge and discharge characteristics, high-temperature characteristics, and power characteristics, and a lithium secondary battery containing the same.

Technical Solution

In one general aspect, there is provided an electrolytic solution for a lithium secondary battery, containing:
a lithium salt;
a non-aqueous organic solvent; and
a difluorophosphite compound of the following Formula 1.

$$A\text{-}OPF_2 \quad \text{[Formula 1]}$$

in Formula 1,
A is a substituted or unsubstituted C1-C10 alkyl or C3-C10 cycloalkyl.

Preferably, according to an embodiment of the present invention, in Formula 1, A may be C1-C10 alkyl or C3-C10 cycloalkyl substituted or unsubstituted with one or more selected from the group consisting of cyano, C1-C10 alkoxy, and C1-C10 alkoxy-C1-C10 alkoxy, and more preferably, A may be C2-C8 alkyl, C2-C8 alkyl substituted with cyano, C2-C8 alkyl substituted with H—$(CH_2CH_2O)_m$—, or C3-C7 cycloalkyl, and m may be an integer of 1 or 2.

Preferably, according to an embodiment of the present invention, Formula 1 may be represented by the following Formula 2 or Formula 3.

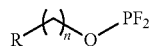

[Formula 2]

in Formula 2,
R is hydrogen, cyano, or H—$(CH_2CH_2O)_m$—,
n is an integer of 2 to 8, and m is an integer of 1 or 2.

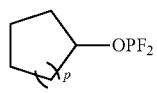

[Formula 3]

in Formula 3,
p is an integer of 1 to 3.

Preferably, according to an embodiment of the present invention, the difluorophosphite compound may be one or more selected from the following compounds.

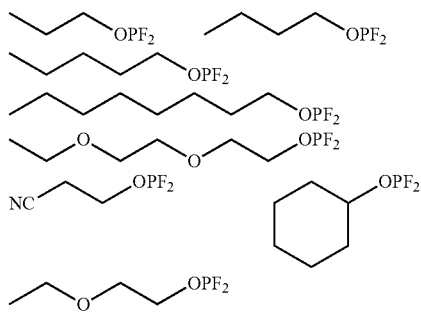

Preferably, according to an embodiment of the present invention, the difluorophosphite compound may be contained in an amount of 0.1 to 5 wt % with respect to a total weight of the electrolytic solution.

Preferably, according to an embodiment of the present invention, the electrolytic solution may further contain one or two or more additional additives selected from 1,3-propane sultone (PS), lithium bis(oxalato)borate (LiBOB), lithium difluoro bis(oxalato)phosphate (LiDFBOP), and ethylene sulfate (ESA), and the additional additive may be contained in an amount of 0.1 to 10.0 wt % with respect to the total weight of the electrolytic solution.

In another general aspect, there is provided a lithium secondary battery including: a cathode containing a nickel-cobalt-manganese-based cathode active material, an anode, a separator interposed between the cathode and the anode, and the electrolytic solution for a secondary battery.

According to an embodiment of the present invention, the active material may include $Li_x(Ni_aCo_bMn_c)O_2$ ($0.5<x<1.3$, $0<a<1$, $0<b<1$, $0<c<1$, and $a+b+c=1$), $Li_x(Ni_aCo_bMn_c)O_4$ ($0.5<x<1.3$, $0<a<2$, $0<b<2$, $0<c<2$, and $a+b+c=2$), or a mixture thereof, preferably, may be $Li_x(Ni_aCo_bMn_c)O_2$ where $0.90 \le x \le 1.10$, $0.3 \le a \le 0.9$, $0.05 \le b<0.5$, $0.05 \le c<0.5$, and $a+b+c=1$, and more preferably, may be $Li(Ni_aCo_bMn_c)O_2$ where $0.3 \le a \le 0.9$, $0.05 \le b<0.5$, $0.05 \le c<0.5$, and $a+b+c=1$.

Advantageous Effects

The electrolytic solution for a lithium secondary battery of the present invention contains the difluorophosphite compound, such that power of the battery does not deteriorate even under a high voltage, and the battery has excellent lifespan characteristics and also has very excellent high-temperature characteristics.

Further, the electrolytic solution for a lithium secondary battery according to the present invention contains the difluorophosphite compound, such that the battery is very excellent not only in a capacity recovery rate but also in high-temperature storage stability at a high temperature, and power characteristics of the battery are also improved.

Further, the lithium secondary battery of the present invention employs the electrolytic solution for a lithium secondary battery of the present invention containing the difluorophosphite compound, such that the battery has excellent high-temperature storage stability while maintaining excellent basic performances such as high-rate charge and discharge characteristics and lifespan characteristics.

Further, the lithium secondary battery of the present invention employs the electrolytic solution for a lithium secondary battery of the present invention containing the difluorophosphite compound, such that a thickness change of the battery is small even after long-term storage at a high temperature, and thus, the battery has significantly excellent high-temperature stability.

Further, the lithium secondary battery of the present invention employs the electrolytic solution for a lithium secondary battery of the present invention containing the difluorophosphite compound, such that internal resistance of the battery is reduced, and thus, the battery has further improved power characteristics.

Further, the lithium secondary battery of the present invention employs the electrolytic solution for a lithium secondary battery of the present invention containing the difluorophosphite compound capable of suppressing a side reaction of the electrolytic solution at a high-temperature and high-voltage environment, such that cycle characteristics and stability of the battery may be improved even when charging at a high temperature and a high voltage.

BEST MODE

Hereinafter, the present invention will be described in more detail. However, technical terms and scientific terms used herein have the general meanings understood by those skilled in the art to which the present invention pertains unless otherwise defined, and a description for the known function and configuration obscuring the present invention will be omitted in the following description.

The term "alkyl" described in the present invention includes both a straight chain type and a branched chain type.

The term "discharge" described herein refers to a process of deintercalating lithium ions from an anode, and the term "charge" refers to a process of intercalating lithium ions into a cathode.

The present invention provides an electrolytic solution for a lithium secondary battery for providing a battery having very excellent high-temperature storage characteristics and lifespan characteristics, and the electrolytic solution for a lithium secondary battery contains:

a lithium salt;
a non-aqueous organic solvent; and
a difluorophosphite compound of the following Formula 1.

$$A\text{-OPF}_2 \quad \text{[Formula 1]}$$

in Formula 1,
A is a substituted or unsubstituted C1-C10 alkyl or C3-C10 cycloalkyl.

Meanwhile, during charging and discharging of the lithium secondary battery, a cathode active material structurally collapses, and metal ions are thus eluted from a surface of a cathode. The eluted metal ions are electrodeposited on an anode to deteriorate the anode. Such a deterioration phenomenon tends to further accelerate when a potential of the cathode is increased or the battery is exposed to a high temperature. In addition, in the lithium secondary battery, in a case where a drive voltage is increased, film decomposition occurs on a surface of the cathode, and the surface of the cathode is thus exposed to an electrolyte, which may cause a side reaction with the electrolyte.

In order to solve such problems, the electrolytic solution for a secondary battery of the present invention contains the difluorophosphite compound of Formula 1. The difluorophosphite compound of Formula 1 contained in the electrolytic solution for a secondary battery of the present invention coordinates to a transition metal of the cathode, such that a structure of the cathode is further stabilized, thereby preventing a battery swelling phenomenon due to gas generated during storage at a high temperature. As a result, a thickness increase rate at a high temperature may be significantly reduced, and deterioration of lifespan characteristics at room temperature may be prevented even in a case where the battery is driven at a high voltage.

That is, the electrolytic solution for a lithium secondary battery of the present invention contains the difluorophosphite compound of Formula 1, and more specifically, contains a difluorophosphite compound having only one —$OPF_2$ substituent, such that the battery has improved heat stability. As a result, the battery has very excellent high-temperature storage characteristics due to a significant reduction in the thickness increase rate of the battery at a high temperature, and the deterioration of the lifespan characteristics at room temperature is prevented due to a reduction in resistance of the battery.

More specifically, the difluorophosphite compound of Formula 1 of the present invention enables reduction in the resistance of the battery under a high voltage to prevent the deterioration of the lifespan characteristics, and coordinates to the transition metal of the cathode to further stabilize the structure of the cathode during storage at a high temperature, such that the thickness increase rate of the battery at a high temperature is minimized, thereby improving high-temperature characteristics. That is, the difluorophosphite compound of Formula 1 of the present invention coordinates to the transition metal of the cathode to further stabilize the structure of the cathode, such that the high-temperature characteristics of the lithium battery at a high temperature and high voltage may be improved.

In terms of chemical stability and electrical characteristics, preferably, according to an embodiment of the present invention, in Formula 1, A may be C1-C10 alkyl or C3-C10 cycloalkyl substituted or unsubstituted with one or more selected from the group consisting of cyano, C1-C10 alkoxy, and C1-C10 alkoxy-C1-C10 alkoxy, and more preferably, A may be C2-C8 alkyl, C2-C8 alkyl substituted with cyano, C2-C8 alkyl substituted with H—$(CH_2CH_2O)_m$—, or C3-C7 cycloalkyl, and m may be an integer of 1 or 2.

Preferably, according to an embodiment of the present invention, the difluorophosphite compound of Formula 1 may be a difluorophosphite compound represented by the following Formula 2 or Formula 3.

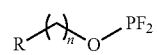
[Formula 2]

in Formula 2,
R is hydrogen, cyano, or H—$(CH_2CH_2O)_m$—,
n is an integer of 2 to 8, and m is an integer of 1 or 2.

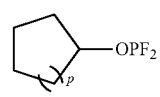
[Formula 3]

in Formula 3,
p is an integer of 1 to 3.
More preferably, in Formula 3, p may be an integer of 1 or 2.

Still more preferably, in Formula 2, R may be hydrogen, and n may be an integer of 3 to 8, and preferably an integer of 5 to 8.

Still more preferably, in Formula 2, R may be cyano or H—$(CH_2CH_2O)_m$—, n may be an integer of 2 to 8, and preferably 2 or 3, and m may be an integer of 1 or 2.

The difluorophosphite compound according to an embodiment of the present invention may be one or more selected from the following structures, but is not limited thereto.

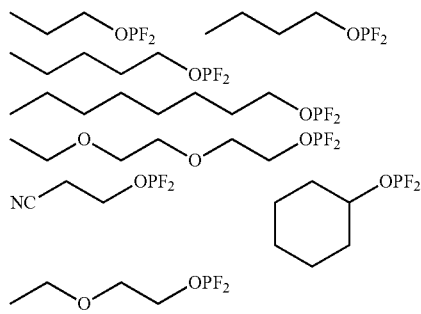

In the electrolytic solution for a lithium secondary battery according to an embodiment of the present invention, the difluorophosphite compound may be contained in an amount of 0.1 to 5 wt % with respect to a total weight of the electrolytic solution for a secondary battery, in terms of improvement of high-temperature stability and prevention of deterioration of the characteristics of the lithium secondary battery due to rapid lifespan deterioration, and more preferably, the difluorophosphite compound may be contained in an amount of 0.5 to 3 wt %, and still more preferably, in an amount of 0.5 to 2 wt %, in terms of the high-temperature stability.

In the electrolytic solution for a lithium secondary battery according to an embodiment of the present invention, the electrolytic solution may further contain one or two or more specific additional additives selected from 1,3-propane sultone (PS), lithium bis(oxalato)borate (LiB$(C_2O_4)_2$, LiBOB), lithium difluoro bis(oxalato)phosphate (LiPF$_2$ $(C_2O_4)_2$, LiDFBOP), and ethylene sulfate (ESA), in order to improve the high-temperature stability.

Preferably, the electrolytic solution for a lithium secondary battery according to an embodiment of the present invention may further contain, as an additional additive, 1,3-propane sultone (PS), lithium bis(oxalato)borate (LiB $(C_2O_4)_2$, LiBOB), and ethylene sulfate (ESA).

Preferably, the electrolytic solution for a lithium secondary battery according to an embodiment of the present invention may further contain lithium difluoro bis(oxalato) phosphate (LiPF$_2(C_2O_4)_2$, LiDFBOP) as an additional additive.

Preferably, the electrolytic solution for a lithium secondary battery according to an embodiment of the present invention may further contain lithium bis(oxalato)borate (LiB$(C_2O_4)_2$, LiBOB) as an additional additive.

Preferably, the electrolytic solution for a lithium secondary battery according to an embodiment of the present invention may further contain 1,3-propane sultone (PS) as an additional additive.

Preferably, the electrolytic solution for a lithium secondary battery according to an embodiment of the present invention may further contain, as an additional additive, lithium bis(oxalato)borate (LiB$(C_2O_4)_2$, LiBOB) and lithium difluoro bis(oxalato)phosphate (LiPF$_2(C_2O_4)_2$, LiDFBOP).

Preferably, the electrolytic solution for a lithium secondary battery according to an embodiment of the present invention may further contain, as an additional additive, 1,3-propane sultone (PS) and lithium difluoro bis(oxalato) phosphate (LiPF$_2$ $(C_2O_4)_2$, LiDFBOP).

Preferably, the electrolytic solution for a lithium secondary battery according to an embodiment of the present invention may further contain, as an additional additive, 1,3-propane sultone (PS), lithium bis(oxalato)borate (LiB $(C_2O_4)_2$, LiBOB), and lithium difluoro bis(oxalato)phosphate (LiPF$_2(C_2O_4)_2$, LiDFBOP).

In the electrolytic solution for a lithium secondary battery according to an embodiment of the present invention, a content of the additional additive is not significantly limited, but the additive may be contained in an amount of 0.1 to 10.0 wt %, more preferably 0.1 to 5.0 wt %, and still more preferably 0.5 to 4.0 wt %, with respect to the total weight of the electrolytic solution, in order to improve high-temperature characteristics such as high-temperature stability, high-temperature storage, and high-temperature lifespan in the electrolytic solution for a secondary battery.

In the electrolytic solution for a lithium secondary battery according to an embodiment of the present invention, the non-aqueous organic solvent may include carbonate, ester, ether, or ketone alone, or a mixed solvent thereof, but it is preferable that the non-aqueous organic solvent is selected from a cyclic carbonate-based solvent, a linear carbonate-based solvent, and a mixed solvent thereof, and it is most preferable to use a mixture of a cyclic carbonate-based solvent and a linear carbonate-based solvent. The cyclic carbonate-based solvent may sufficiently dissociate lithium ions due to its large polarity, but has a disadvantage in that ion conductivity thereof is small due to a large viscosity. Therefore, characteristics of the lithium secondary battery may be optimized by using a mixture obtained by mixing the cyclic carbonate-based solvent with a linear carbonate-based solvent having a small polarity and a low viscosity.

The cyclic carbonate-based solvent may be selected from the group consisting of ethylene carbonate, propylene carbonate, butylene carbonate, vinylene carbonate, vinylethylene carbonate, fluoroethylene carbonate, and a mixture thereof. The linear carbonate solvent may be selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

In the electrolytic solution for a lithium secondary battery according to an embodiment of the present invention, the non-aqueous organic solvent is a mixed solvent of a cyclic carbonate-based solvent and a linear carbonate-based solvent. A mixed volume ratio of the linear carbonate-based solvent to the cyclic carbonate-based solvent may be 1 to 9:1 and preferably 1.5 to 4:1.

In the electrolytic solution for a lithium secondary battery according to an embodiment of the present invention, the lithium salt may be, but not limited to, one or two or more selected from the group consisting of LiPF$_6$, LiBF$_4$, LiClO$_4$, LiSbF$_6$, LiAsF$_6$, LiN(SO$_2$C$_2$F$_5$)$_2$, LiN(CF$_3$SO$_2$)$_2$, LiN (SO$_3$C$_2$F$_5$)$_2$, LiN(SO$_2$F)$_2$, LiCF$_3$SO$_3$, LiC$_4$F$_9$SO$_3$, LiC$_6$H$_5$SO$_3$, LiSCN, LiAlO$_2$, LiAlCl$_4$, LiN(C$_x$F$_{2x+1}$SO$_2$) (C$_y$F$_{2y+1}$SO$_2$) (here, x and y are each independently a natural number), LiCl, LiI, and LiB(C$_2$O$_4$)$_2$.

A concentration of the lithium salt is preferably in a range of 0.1 to 2.0 M, and more preferably, in a range of 0.7 to 1.6

M. When the concentration of the lithium salt is less than 0.1 M, conductivity of the electrolytic solution is decreased, and a performance of the electrolytic solution is thus deteriorated. When the concentration of the lithium salt is more than 2.0 M, a viscosity of the electrolytic solution is increased, and mobility of the lithium ion is thus reduced. The lithium salt acts as a supply source of the lithium ion in the battery to enable a basic operation of the lithium secondary battery.

The electrolytic solution for a lithium secondary battery according to an embodiment of the present invention is usually stable in a temperature range of −20° C. to 60° C., and preferably at 40 to 60° C., and electrochemically stable properties thereof are maintained even at a high voltage of 4.20 V or more, specifically, 4.30 V or more, and more specifically, 4.35 V or more, based on a cathode potential. Therefore, the electrolytic solution may be applied to all of the lithium secondary batteries such as a lithium ion battery and a lithium polymer battery.

In addition, the present invention provides a lithium secondary battery containing the electrolytic solution for a lithium secondary battery according to an embodiment of the present invention.

Non-limiting examples of the secondary battery according to an embodiment of the present invention include a lithium metal secondary battery, a lithium ion secondary battery, a lithium polymer secondary battery, and a lithium ion polymer secondary battery.

When the lithium secondary battery produced by using the electrolytic solution for a lithium secondary battery according to an embodiment of the present invention is left at a high temperature for a long period of time, a thickness increase rate of the battery is less than 10%, which is very low, and the battery has high power.

The lithium secondary battery of the present invention includes a cathode containing a nickel-cobalt-manganese-based cathode active material, an anode, a separator interposed between the cathode and the anode, and the electrolytic solution for a secondary battery containing the difluorophosphite compound.

Specifically, the cathode according to an embodiment of the present invention includes a cathode active material capable of intercalating and deintercalating lithium ions, and the cathode active material according to the present invention may be a nickel-cobalt-manganese-based active material which is preferably combined with the electrolytic solution for a lithium secondary battery according to an embodiment of the present invention.

The difluorophosphite compound contained in the electrolytic solution for a secondary battery according to an embodiment of the present invention coordinates to the transition metal of the cathode to further stabilize the structure of the cathode, such that decomposition of the electrolytic solution may be prevented through suppression of a side reaction of the surface of the cathode with the electrolytic solution during storage at a high temperature, which prevents gas from being generated and thus a swelling phenomenon in which a battery swells may be effectively suppressed. As a result, the high-temperature storage stability of the lithium secondary battery may be improved. In addition, cycle lifespan characteristics and stability of the battery may be improved even under a high temperature and a high voltage.

That is, according to an embodiment of the present invention, in a case where both the electrolytic solution for a secondary battery containing the difluorophosphite compound and the cathode active material containing the nickel-cobalt-manganese-based active material are applied to a secondary battery, the problems such as the swelling phenomenon caused by the nickel-cobalt-manganese-based active material having a high nickel content and deterioration of the high-temperature stability may be solved.

Preferably, the cathode active material according to an embodiment of the present invention may be $Li_x(Ni_aCo_bMn_c)O_2$ ($0.5<x<1.3$, $0<a<1$, $0<b<1$, $0<c<1$, and $a+b+c=1$), $Li_x(Ni_aCo_bMn_c)O_4$ ($0.5<x<1.3$, $0<a<2$, $0<b<2$, $0<c<2$, and $a+b+c=2$), or a mixture thereof, and more preferably, may be $Li_x(Ni_aCo_bMn_c)O_2$ where $0.90 \le x \le 1.10$, $0.3 \le a \le 0.9$, $0.05 \le b < 0.5$, $0.05 \le c < 0.5$, and $a+b+c=1$.

The cathode active material which is preferably combined with the electrolytic solution for a lithium secondary battery according to an embodiment of the present invention containing the difluorophosphite compound, in particular, with the electrolytic solution for a lithium secondary battery containing 1,3-propane sultone (PS), lithium bis(oxalato) borate (LiBOB), and ethylene sulfate (ESA) which are additional additives, in addition to the difluorophosphite compound, the cathode active material being contained in the lithium secondary battery according to an embodiment of the present invention, is $Li_x(Ni_aCo_bMn_c)O_2$ where $0.90 \le x \le 1.10$, $0.3 \le a \le 0.9$, $0.05 \le b < 0.5$, $0.05 \le c < 0.5$, and $a+b+c=1$, and more preferably, may be $Li(Ni_aCo_bMn_c)O_2$ where $0.3 \le a \le 0.9$, $0.05 \le b < 0.5$, $0.05 \le c < 0.5$, and $a+b+c=1$.

A lithium secondary battery employing the cathode active material which is $Li(Ni_aCo_bMn_c)O_2$ where $0.3 \le a \le 0.9$, $0.05 \le b < 0.5$, $0.05 \le c < 0.5$, and $a+b+c=1$ has particularly significantly improved high-temperature storage stability and lifespan characteristics at a high voltage, $Li(Ni_aCo_bMn_c)O_2$ being preferably combined with the electrolytic solution for a secondary battery according to an embodiment of the present invention containing the difluorophosphite compound, and 1,3-propane sultone (PS), lithium bis(oxalato) borate (LiBOB), and ethylene sulfate (ESA) which are additional additives.

Preferably, the cathode active material according to an embodiment of the present invention may be $LiNi_{0.6}Co_{0.2}Mn_{0.2}O_2$, $LiNi_{0.5}Co_{0.2}Mn_{0.3}O_2$, $LiNi_{0.8}Co_{0.1}Mn_{0.1}O_2$, $LiNi_{1/3}Co_{1/3}Mn_{1/3}O_2$, or a mixture thereof, and more preferably, may be $LiNi_{0.8}Co_{0.1}Mn_{0.1}O_2$, $LiNi_{0.5}Co_{0.2}Mn_{0.3}O_2$, or a mixture thereof, and still more preferably, may be $LiNi_{0.8}Co_{0.1}Mn_{0.1}O_2$, or a mixture of $LiNi_{0.8}Co_{0.1}Mn_{0.1}O_2$ and $LiNi_{0.5}Co_{0.2}Mn_{0.3}O_2$.

The anode includes an anode current collector and an anode active material layer formed on the anode current collector. The anode active material layer contains an anode active material capable of intercalating and deintercalating the lithium ions, and as the anode active material, a carbon material such as crystalline carbon, amorphous carbon, a carbon complex, or a carbon fiber, a lithium metal, an alloy of lithium and another element, or the like, may be used. Non-limiting examples of the amorphous carbon include soft carbon (carbon baked at a low temperature), hard carbon, coke, mesocarbon microbead (MCMB) baked at a temperature of 1500° C. or lower, and mesophase pitch-based carbon fiber (MPCF). Non-limiting examples of the crystalline carbon include graphite based materials, specifically, natural graphite, graphitized coke, graphitized MCMB, and graphitized MPCF. As the carbon material, a material of which an interplanar distance is 3.35 to 3.38 Å, and a crystallite size Lc measured by X-ray diffraction is at least 20 nm or more may be preferable. As another element forming the alloy with lithium, aluminum, zinc, bismuth, cadmium, antimony, silicon, lead, tin, gallium, or indium may be used.

The cathode or the anode may be prepared by dispersing an electrode active material, a binder, and a conductive material, and if necessary, a thickener, in a solvent to prepare an electrode slurry composition, and applying the electrode slurry composition onto an electrode current collector. As a cathode current collector, aluminum, an aluminum alloy, or the like may be mainly used, and as the anode current collector, copper, a copper alloy, or the like may be mainly used. An example of a shape of each of the cathode current collector and the anode current collector may include a foil or a mesh shape.

The binder is a material playing a role in paste formation of the active material, adhesion between the active materials, adhesion with the current collector, a buffering effect on expansion and contraction of the active material, and the like. Examples of the binder include polyvinylidene fluoride (PVdF), a polyhexafluoropropylene-polyvinylidene fluoride (PVdF/HFP) copolymer, poly(vinylacetate), polyvinyl alcohol, polyethyleneoxide, polyvinylpyrrolidone, alkylated polyethyleneoxide, polyvinyl ether, poly(methylmethacrylate), poly(ethylacrylate), polytetrafluoroethylene, polyvinylchloride, polyacrylonitrile, polyvinylpyridine, styrene-butadiene rubber, and acrylonitrile-butadiene rubber. A content of the binder is 0.1 to 30 wt %, preferably 1 to 10 wt %, with respect to the electrode active material. When the content of the binder is excessively small, an adhesive force between the electrode active material and the current collector is insufficient, and when the content of the binder is excessively large, the adhesive force is improved, but a content of the electrode active material is decreased in accordance with the content of the binder, which is disadvantageous in allowing the battery to have high capacity.

The conductive material is used to impart conductivity to the electrode, and any electronic conductive material may be used as long as it does not cause a chemical change in a battery to be configured. At least one selected from the group consisting of a graphite-based conductive material, a carbon black-based conductive material, and a metal or metal compound-based conductive material may be used. Examples of the graphite-based conductive material include artificial graphite and natural graphite. Examples of the carbon black-based conductive material include acetylene black, Ketjen black, Denka black, thermal black, and channel black. Examples of the metal or metal compound-based conductive material include tin, tin oxide, tin phosphate ($SnPO_4$), titanium oxide, potassium titanate, and a perovskite material such as $LaSrCoO_3$ or $LaSrMnO_3$. However, the conductive material is not limited thereto.

A content of the conductive material is preferably 0.1 to 10 wt % with respect to the electrode active material. When the content of the conductive material is less than 0.1 wt %, electrochemical properties are deteriorated, and when the content is more than 10 wt %, energy density per weight is decreased.

Any thickener may be used without limitation as long as it may serve to adjust a viscosity of the active material slurry, but, for example, carboxymethyl cellulose, hydroxymethyl cellulose, hydroxyethyl cellulose, hydroxypropyl cellulose, or the like may be used.

As the solvent in which the electrode active material, the binder, the conductive material, and the like are dispersed, a non-aqueous solvent or an aqueous solvent may be used. Examples of the non-aqueous solvent may include N-methyl-2-pyrrolidone (NMP), dimethylformamide, dimethylacetamide, N,N-dimethylaminopropylamine, ethyleneoxide, and tetrahydrofuran.

The lithium secondary battery according to an embodiment of the present invention may include a separator preventing a short circuit between the cathode and the anode and providing a movement path of the lithium ions. As such a separator, polyolefin-based polymer films formed of polypropylene, polyethylene, polyethylene/polypropylene, polyethylene/polypropylene/polyethylene, or polypropylene/polyethylene/polypropylene, or a multi-layer thereof, a micro-porous film, woven fabric, and non-woven fabric may be used. In addition, a film obtained by coating a resin having excellent stability on a porous polyolefin film may be used.

The lithium secondary battery of the present invention may have various shapes such as a cylindrical shape and a pouch shape, in addition to an angular shape. The secondary battery is suitable for the use requiring a high voltage, high power, and driving at a high temperature, such as an electric vehicle, in addition to the existing use for a mobile phone, a portable computer, and the like. In addition, the secondary battery may also be used for a hybrid vehicle in connection with the existing internal combustion engine, fuel cell, super capacitor, or the like, and may be used for all other purposes such as an electric bike and a power tool requiring high power, a high voltage, and driving at a high temperature.

Hereinafter, examples and comparative examples of the present invention will be described. However, the following examples are merely preferred examples of the present invention, and the present invention is not limited to the following examples. It is presumed that the lithium salt is entirely dissociated to have lithium ion having a concentration of 1 mole (1 M), and a base electrolytic solution may be formed by dissolving a corresponding amount of the lithium salt such as $LiPF_6$ in a basic solvent so as to have a concentration of 1 mole (1 M).

[Example 1] Preparation of pentyldifluorphosphite ($CH_3(CH_2)_4OPF_2$; Hereinafter, Referred to as "PDFP")

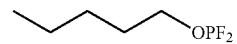

Step 1: Preparation of pentyldichlorophosphite ($CH_3(CH_2)_4OPCl_2$)

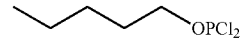

Tetrahydrofuran (200 mL) was added to a 500 mL flask. Trichlorophosphine ($PCl_3$) (56 mL, 0.57 mol) was added thereto, the mixture was stirred for 10 minutes, and then the temperature was lowered using ice water so that the mixture was in a low-temperature state of about 0° C. 1-Pentanol (50 g, 0.57 mol) was slowly added dropwise thereto for 30 minutes, and the mixture was stirred for 3 hours while increasing the temperature to room temperature. A pressure of the reaction mixture was reduced to vacuum to remove volatiles. Analysis was performed using a nuclear magnetic resonance device to confirm a residual material and a final product. Pentyldichlorophosphite (75 g, 0.40 mol) obtained after the pressure reduction was obtained as a final product with a purity of almost 100% in a yield of 70%.

¹H NMR (500 MHz, C₆D₆)δ 0.94 (m, 3H), 1.00-1.40 (m, 6H), 3.80 (m, 2H) ppm.

Step 2: Preparation of pentyldifluorphosphite (CH₃(CH₂)₄OPF₂)

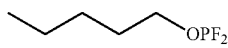

Antimony trifluoride (SbF₃) (20 g, 0.11 mol) was added to a 100 mL flask under a nitrogen atmosphere. The temperature was lowered so that the mixture was in a low-temperature state of about 0° C., in order to prevent heat generation, composite damage, yield reduction of a final product, or the like, due to an abrupt reaction. The pentyldichlorophosphite (30 g, 0.16 mol) prepared in Step 1 was slowly added dropwise. As the reaction proceeded, the reaction mixture turned into a brown or dark brown liquid. The reaction was allowed to proceed sufficiently at room temperature for 12 hours or longer, and then the reaction mixture was heated and subjected to vacuum distillation for purification. That is, PDFP (12 g, 0.077 mol) which began to distill as a clear liquid at the time when an external heating temperature approached about 130° C. was obtained as a final product in a yield of 48%.

¹H NMR (500 MHz, C₆D₆)δ 0.74 (m, 3H), 1.00-1.20 (m, 4H), 1.30 (m, 2H), 3.67 (q, 2H) ppm; ³¹P NMR (500 MHz, C₆D₆)δ 110 ppm (t, 2P); ¹⁹F NMR (500 MHz, C₆D₆)δ −46 (s, F), −50 ppm (s, F).

[Example 2] Preparation of octyldifluorphosphite (CH₃(CH₂)₇OPF₂; Hereinafter, Referred to as "ODFP")

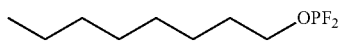

Step 1: Preparation of octyldichlorophosphite (CH₃(CH₂)₇OPCl₂)

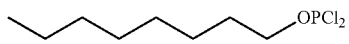

Acetonitrile (15 mL) was added to a 100 mL flask under a nitrogen atmosphere, trichlorophosphine (PCl₃) (5 mL, 57.3 mmol) was added thereto, and then the temperature was lowered to −15° C. using brine and dry ice. A solution obtained by dissolving 1-octanol (5.97 g, 45.8 mmol) in acetonitrile (15 mL) was slowly added dropwise thereto for 1 hour, and the mixture was stirred for 3 hours while increasing the temperature to room temperature. A pressure of the reaction mixture was reduced to vacuum to remove the solvent, and octyldichlorophosphite (6.00 g, 26.0 mmol) was obtained through an additional distillation under reduced pressure as a final product in a yield of 56.6%.

¹H NMR (500 MHz, C₆D₆)δ 3.85 (qui, 2H), 1.24 (m, 4H), 1.14 (m, 4H), 1.02 (m, 4H), 0.87 (t, 3H) ppm.

Step 2: Preparation of octyldifluorphosphite (CH₃(CH₂)₇OPF₂)

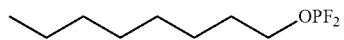

Antimony trifluoride (SbF₃) (3.07 g, 17.2 mmol) was added to a 50 mL flask under a nitrogen atmosphere. The temperature was lowered to about 0° C. in order to prevent heat generation, composite damage, yield reduction of a final product, or the like, due to an abrupt reaction. The octyldichlorophosphite (5.90 g, 25.4 mmol) obtained in Step 1 was slowly added dropwise for 40 minutes, and then the mixture was additionally stirred for 2 hours while increasing the temperature to room temperature. Distillation under reduced pressure was performed for purification and ODFP (4.00 g, 20.2 mmol) was obtained as a final product in a yield of 79.1%.

¹H NMR (500 MHz, C₆D₆)δ 3.69 (qui, 2H), 1.25 (m, 4H), 1.14 (m, 4H), 1.05 (m, 4H), 0.87 (t, 3H) ppm.

[Example 3] Preparation of 2-(2-ethoxyethoxy)ethyl difluorophosphite (CH₃CH₂O (CH₂)₂O(CH₂)₂OPF₂; Hereinafter, Referred to as "EEEDFP")

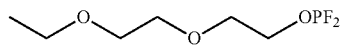

Step 1: Preparation of 2-(2-ethoxyethoxy)ethyl dichlorophosphite (CH₃CH₂O (CH₂)₂O(CH₂)₂OPCl₂)

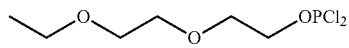

Dichloromethane (38 mL) was added to a 100 mL flask under a nitrogen atmosphere, trichlorophosphine (PCl₃) (5 mL, 57.3 mmol) was added thereto, and then the temperature was lowered to 0° C. 2-(2-Ethoxyethoxy)ethanol (7.54 g, 56.2 mmol) was slowly added dropwise thereto for 1 hour, and the mixture was stirred for 4 hours while increasing the temperature to room temperature. A pressure of the reaction mixture was reduced to vacuum to remove the solvent, and 2-(2-ethoxyethoxy)ethyl dichlorophosphite (11.08 g, 47.1 mmol) was obtained as a final product in a yield of 83.9%.

¹H NMR (500 MHz, C₆D₆)δ 3.85 (qui, 2H), 3.32 (s, 4H), 3.21 (m, 4H), 1.06 (t, 3H) ppm.

Step 2: Preparation of 2-(2-ethoxyethoxy)ethyl difluorophosphite (CH₃CH₂O (CH₂)₂O(CH₂)₂OPF₂)

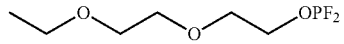

Antimony trifluoride (SbF₃) (5.61 g, 31.4 mmol) was added to a 50 mL flask under a nitrogen atmosphere. The temperature was lowered to about 0° C. in order to prevent heat generation, composite damage, yield reduction of a final product, or the like, due to an abrupt reaction. The 2-(2-ethoxyethoxy)ethyl dichlorophosphite (11.08 g, 47.1 mmol) obtained in Step 1 was slowly added dropwise for 40 minutes, and then the mixture was additionally stirred for 3 hours while increasing the temperature to room temperature. Distillation under reduced pressure was performed for purification and EEEDFP (5.10 g, 25.2 mmol) was obtained as a final product in a yield of 53.5%.

$^1$H NMR (500 MHz, $C_6D_6$) δ 3.72 (qui, 2H), 3.32 (s, 4H), 3.24 (m, 2H), 3.15 (t, 2H), 1.06 (t, 3H) ppm.

[Example 4] 2-cyanoethyldifluorophosphite (CN(CH$_2$)$_2$OPF$_2$; Hereinafter, Referred to as "CEDFP")

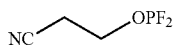

Step 1: Preparation of 2-cyanoethyldichlorophosphite (CN(CH$_2$)$_2$OPCl$_2$)

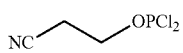

Acetonitrile (55 mL) was added to a 250 mL flask under a nitrogen atmosphere, trichlorophosphine (PCl$_3$) (20 mL, 230 mmol) was added thereto, and then the temperature was lowered to −15° C. using brine and dry ice. A solution obtained by dissolving 2-cyanoethanol (16.0 g, 225 mmol) in acetonitrile (40 mL) was slowly added dropwise thereto for 1 hour, and the mixture was stirred for 3 hours while increasing the temperature to room temperature. A pressure of the reaction mixture was reduced to vacuum to remove the solvent, and 2-cyanoethyldichlorophosphite (7.35 g, 42.7 mmol) was obtained through an additional distillation under reduced pressure as a final product in a yield of 19.0%.

$^1$H NMR (500 MHz, $C_6D_6$) δ 3.30 (q, 2H), 1.32 (t, 2H) ppm.

Step 2: Preparation of 2-cyanoethyldifluorophosphite (CN(CH$_2$)$_2$OPF$_2$)

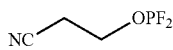

Antimony trifluoride (SbF$_3$) (4.86 g, 27.3 mmol) was added to a 50 mL flask under a nitrogen atmosphere. The temperature was lowered to about 0° C. in order to prevent heat generation, composite damage, yield reduction of a final product, or the like, due to an abrupt reaction. The 2-cyanoethyldichlorophosphite (7.0 g, 40.7 mmol) obtained in Step 1 was slowly added dropwise for 40 minutes, and then the mixture was additionally stirred for 2 hours while increasing the temperature to room temperature. Distillation under reduced pressure was performed for purification and CEDFP (1.41 g, 10.1 mmol) was obtained as a final product in a yield of 24.9%.

$^1$H NMR (500 MHz, $C_6D_6$) δ 3.14 (q, 2H), 1.31 (t, 2H) ppm.

[Example 5] Preparation of cyclohexyldifluorophosphite ($C_6H_{11}$OPF$_2$; Hereinafter, Referred to as "CHDFP")

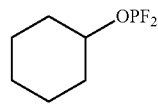

Step 1: Preparation of cyclohexyldichlorophosphite ($C_6H_{11}$OPCl$_2$)

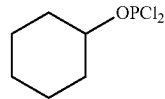

Acetonitrile (20 mL) was added to a 100 mL flask under a nitrogen atmosphere, trichlorophosphine (PCl$_3$) (5 mL, 57.3 mmol) was added thereto, and then the temperature was lowered to −15° C. using brine and dry ice. A solution obtained by dissolving cyclohexanol (5.47 g, 54.6 mmol) in acetonitrile (14 mL) was slowly added dropwise thereto for 30 minutes, and the mixture was stirred for 1 hour while increasing the temperature to room temperature. A pressure of the reaction mixture was reduced to vacuum to remove the solvent, and cyclohexyldichlorophosphite (9.42 g, 46.9 mmol) as a final product was obtained in a yield of 85.8%.

$^1$H NMR (500 MHz, $C_6D_6$) δ 4.63 (m, 1H), 1.62 (m, $^2$H), 1.36 (m, 5H), 0.95 (m, 3H) ppm.

Step 2: Preparation of cyclohexyldifluorophosphite ($C_6H_{11}$OPF$_2$)

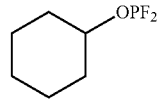

Antimony trifluoride (SbF$_3$) (5.61 g, 31.5 mmol) was added to a 50 mL flask under a nitrogen atmosphere. The temperature was lowered to about 0° C. in order to prevent heat generation, composite damage, yield reduction of a final product, or the like, due to an abrupt reaction. The cyclohexyldichlorophosphite (9.42 g, 46.9 mmol) obtained in Step 1 was slowly added dropwise for 30 minutes, and then the mixture was additionally stirred for 2 hours while increasing the temperature to room temperature. Distillation under reduced pressure was performed for purification and CHDFP (3.66 g, 21.8 mmol) was obtained as a final product in a yield of 46.5%.

$^1$H NMR (500 MHz, $C_6D_6$) δ 4.37 (m, 1H), 1.56 (m, 2H), 1.351 (m, 1H), 1.39 (m, 2H), 1.31 (m, 2H), 0.93 (m, 3H) ppm.

[Example 6] Preparation of ethoxyethyldifluorophosphite ($C_2H_5$ $OC_2H_4OPF_2$; Hereinafter, Referred to as "EEDFP")

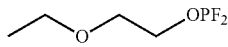

Step 1: Preparation of ethoxyethyldichlorophosphite ($C_2H_5OC_2H_4OPCl_2$)

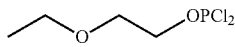

Heptane (20 mL) was added to a 100 mL flask under a nitrogen atmosphere, trichlorophosphine ($PCl_3$) (8 mL, 58.3 mmol) was added thereto, and then the temperature was lowered to −15° C. using brine and dry ice. Ethoxyethanol (5.00 g, 55.5 mmol) was slowly added dropwise thereto for 30 minutes, and the mixture was stirred for 1 hour while increasing the temperature to room temperature. A pressure of the reaction mixture was reduced to vacuum to remove the solvent, and ethoxyethyldichlorophosphite (4.56 g, 23.9 mmol) was obtained as a final product in a yield of 43.0%.

$^1$H NMR (500 MHz, $C_6D_6$) δ 3.93 (m, 2H), 3.10 (m, $^4$H), 0.99 (m, H) ppm

Step 2: Preparation of ethoxyethyldifluorophosphite ($C_2H_5$ $OC_2H_4OPF_2$)

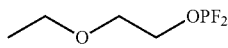

Antimony trifluoride ($SbF_3$) (2.86 g, 16.0 mmol) was added to a 50 mL flask under a nitrogen atmosphere. The temperature was lowered to about 0° C. in order to prevent heat generation, composite damage, yield reduction of a final product, or the like, due to an abrupt reaction. The ethoxyethyldichlorophosphite (4.56 g, 23.9 mmol) obtained in Step 1 was slowly added dropwise for 30 minutes, and then the mixture was additionally stirred for 2 hours while increasing the temperature to room temperature. Distillation under reduced pressure was performed for purification and EEDFP (1.04 g, 6.58 mmol) was obtained as a final product in a yield of 27.6%.

$^1$H NMR (500 MHz, $C_6D_6$) δ 3.73 (m, 2H), 3.11 (m, $^2$H), 3.05 (m, 2H), 1.00 (t, 3H) ppm.

[Comparative Preparation Example 1] Preparation of 1,2-bis((difluorophosphanyl)oxy)ethane (or ethyl 1,2-bis-difluorophosphite ($F_2PO(CH_2)_2OPF_2$), hereinafter, referred to as "BDFPOE")

Step 1: Preparation of 1,2-bis((difluorophosphanyl)oxy)ethane (or ethyl 1,2-bis-difluorophosphite ($Cl_2PO(CH_2)_2OPCl_2$))

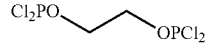

100 mL of tetrahydrofuran was added to a 250 mL flask. Trichlorophosphine ($PCl_3$) (31.23 mL, 0.35 mol) was added thereto, the mixture was stirred for about 10 to 30 minutes, and then the temperature was lowered using ice water so that the mixture was in a low-temperature state about 0° C. Ethylene glycol (10 g, 0.16 mol) was slowly added dropwise thereto for 30 minutes. After adding the entire ethylene glycol, the temperature was increased to room temperature, and the mixture was stirred for 3 hours. A pressure of the reaction mixture was reduced to vacuum to remove volatiles, and then 1,2-bis((dichlorophosphanyl)oxy)ethane ($Cl_2PO(CH_2)_2OPCl_2$) (1.10 g, 4.16 mmol) which was a clear liquid under a pressure reduction condition of 10 torr at an external heating temperature of 130 to 180° C. was obtained as a final product in a yield of 2.6%. 2-Chloro-1,3,2-dioxaphospholane ($C_2H_4ClO_2P$) which is a substance having a cyclic form is mostly prepared as a major product, and a title compound is prepared as a minor product.

$^1$H NMR (500 MHz, $C_6D_6$) δ 3.4 (d, 4H) ppm.

Step 2: Preparation of 1,2-bis((difluorophosphanyl)oxy)ethane (or ethyl 1,2-bis-difluorophosphite ($F_2PO(CH_2)_2OPF_2$))

Antimony trifluoride ($SbF_3$) (0.11 g, 0.61 mmol) was added to a 50 mL flask under a nitrogen atmosphere. The temperature was lowered to a low-temperature of about 0° C. in order to prevent heat generation, composite damage, yield reduction of a final product, or the like, due to an abrupt reaction. The 1,2-bis((difluorophosphanyl)oxy)ethane (1.10 g, 4.16 mmol) prepared in Step 1 was slowly added dropwise to the flask. As the reaction proceeded, the reaction mixture turned into a brown or dark brown liquid. The reaction sufficiently proceeded at room temperature for 12 hours or longer, and then, the mixture was heated and purified. That is, a clear liquid began to distill at the time when an external heating temperature approached about 50° C., and BDFPOE (0.16 g, 0.83 mmol) was obtained as a final product in a yield of 20%.

$^1$H NMR (500 MHz, $C_6D_6$) δ 3.4 (d, 4H) ppm; $^{31}$P NMR (500 MHz, $C_6D_6$) δ 110 (t, 2P) ppm; $^{19}$F NMR (500 MHz, $C_6D_6$) δ -46 (s, F), −49 (s, F) ppm.

Examples 7 to 12 and Comparative Examples 1 to 3

A solution obtained by dissolving $LiPF_6$ in a mixed solvent in which ethylene carbonate (EC), ethyl methyl carbonate (EMC), and diethyl carbonate (DEC) were mixed with each other at a volume ratio of 25:45:30 so as to have a 1.0 M solution was used as a base electrolytic solution (1.0 M $LiPF_6$, EC/EMC/DEC=25:45:30), and components shown in Table 1 were additionally added to the base electrolytic solution, thereby preparing an electrolytic solution.

A battery to which the non-aqueous electrolytic solution was applied was prepared as follows.

$LiNi_{0.8}Co_{0.1}Mn_{0.1}O_2$ and $LiNi_{0.5}Co_{0.2}Mn_{0.3}O_2$ were mixed with each other at a weight ratio of 5:5 and the mixture was used as a cathode active material, polyvinylidene fluoride (PVdF) was used as a binder, and carbon was used as a conductive material. The cathode active material, the binder, and the conductive material were mixed with each other at a weight ratio of 92:4:4, and then the mixture was dispersed in N-methyl-2-pyrrolidone, thereby preparing a cathode slurry. The slurry was coated on an aluminum foil having a thickness of 20 μm, dried, and rolled, thereby preparing a cathode. Artificial graphite and natural graphite were mixed with each other at a ratio of 7:3 and the mixture was used as an anode active material, styrene-butadiene rubber was used as a binder, and carboxymethyl cellulose was used as a thickener. The anode active material, the binder, and the thickener were mixed with each other at a weight ratio of 96:2:2, and the mixture was dispersed in water, thereby preparing an anode active material slurry. The slurry was coated on a copper foil having a thickness of 15 μm, dried, and rolled, thereby preparing an anode.

A film separator formed of a polyethylene (PE) material and having a thickness of 25 μm was stacked between the prepared electrodes, a cell was configured using a pouch having a size of thickness 8 mm×length 60 mm×width 90 mm, and the non-aqueous electrolytic solution was injected to the pouch, thereby producing a 1.7 Ah-class lithium secondary battery.

Performance of the 1.7 Ah-class lithium secondary battery produced as described above was evaluated as follows. The results are shown in Table 1. Evaluation items are as follows.

*Evaluation Items*

1. Thickness increase rate at 60° C. after 8 weeks: When, after a battery was charged to 4.2 V with 1.7 A CC-CV at room temperature for 3 hours, a thickness of the charged battery was defined as A, and a thickness of the battery left at 60° C. and normal pressure exposed to atmosphere for 8 weeks using a sealed thermostatic device was defined as B, a thickness increase rate was calculated by the following Expression 1. The thickness of the cell was measured using a flat plate thickness measuring device (543-490B, manufactured by Mitutoyo Corporation).

$(B-A)/A \times 100(\%)$ [Expression 1]

2. Discharge direct current internal resistance (DCIR) at 60° C. after 8 weeks: After the cell was left in a chamber of 60° C. at a high temperature for 8 weeks, C-rates were sequentially increased to 0.2 C, 0.5 C, 1.0 C, 1.5 C, 2.0 C, 2.5 C, and 3.0 C at a point of time when SOC of the cell was set to 60%, a termination point of a voltage when charge and discharge at the corresponding C-rate were performed for 10 seconds was configured as a straight linear equation, and a slope thereof was adopted as DCIR.

3. Amount of gas generated at 60° C. after 1 week: The battery was left at 60° C. for 1 week and left at room temperature for 30 minutes, and then the battery was placed in a chamber for measuring the amount of gas generated. The chamber was placed under vacuum and was filled with nitrogen gas to normal pressure. At this time, a nitrogen volume ($V_0$) and a chamber internal pressure ($P_0$) were measured. The chamber was placed under vacuum again and a hole was made in the battery to measure a chamber internal pressure ($P_1$).

Amount of gas generated (mL)=$V_0/P_0*P_1$

TABLE 1

| | | | High-temperature storage at 60° C. | | | |
| | | | After 8 weeks | | | After 1 week |
| | Composition of electrolytic solution | Initial thickness [mm] | Thickness [mm] | Thickness increase rate [%] | Discharge DCIR [mΩ] | Amount of gas generated [mL] |
| --- | --- | --- | --- | --- | --- | --- |
| Example 7 | Base electrolytic solution + PDFP 1.0 wt % | 5.23 | 6.40 | 22.4 | 68.9 | 10.20 |
| Example 8 | Base electrolytic solution + ODFP 1.0 wt % | 5.25 | 6.41 | 22.1 | 70.1 | 10.17 |
| Example 9 | Base electrolytic solution + EEEDFP 1.0 wt % | 5.31 | 6.46 | 21.7 | 70.8 | 10.29 |
| Example 10 | Base electrolytic solution + CEDFP 1.0 wt % | 5.29 | 6.50 | 22.9 | 72.4 | 10.27 |
| Example 11 | Base electrolytic solution + CHDFP 1.0 wt % | 5.12 | 6.71 | 31.2 | 71.7 | 11.01 |
| Example 12 | Base electrolytic solution + CEDFP 1.0 wt % + PS 0.5 wt % + LiBOB 0.5 wt % + ESA 0.5 wt % | 5.43 | 5.80 | 6.8 | 52.1 | 2.81 |
| Comparative Example 1 | Base electrolytic solution | 5.20 | 8.13 | 56.3 | 86.1 | 13.87 |
| Comparative Example 2 | Base electrolytic solution + Comparative Compound C1 1.0 wt % | 5.32 | 7.36 | 38.3 | 74.1 | 11.17 |

TABLE 1-continued

|  | Composition of electrolytic solution | Initial thickness [mm] | High-temperature storage at 60° C. | | | After 1 week Amount of gas generated [mL] |
|---|---|---|---|---|---|---|
|  |  |  | After 8 weeks | | | |
|  |  |  | Thickness [mm] | Thickness increase rate [%] | Discharge DCIR [mΩ] | |
| Comparative Example 3 | Base electrolytic solution + Comparative Compound C2 1.0 wt % | 5.30 | 7.19 | 35.7 | 73.0 | 11.07 |

Base electrolytic solution: 1.0 M LiPF$_6$, EC/EMC/DEC = 25:45:30

PDPF: 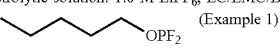 (Example 1)

ODFP: 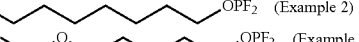 (Example 2)

EEEDFP: 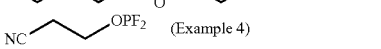 (Example 3)

CEDFP: 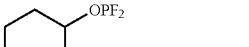 (Example 4)

CHDFP: 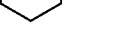 (Example 5)

Comparative Compound C1: 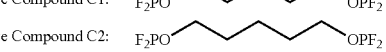

Comparative Compound C2: 

PS: 1,3-propane Sultone
LiBOB: lithium bis(oxalato)borate
ESA: ethylene sulfate

As seen from Table 1, it could be confirmed that in the lithium secondary battery of the example containing the non-aqueous electrolytic solution of the present invention including the difluorophosphite compound as an additive, high-temperature storability was improved as compared with the lithium secondary battery of the comparative example in which the additive was not included, and thus, the thickness increase after storage at a high-temperature was reduced. It could be confirmed that in the lithium secondary battery particularly employing the non-aqueous electrolytic solution including the difluorophosphite compound having a linear structure as an additive, the thickness increase after storage at a high-temperature was significantly low.

That is, it could be appreciated that the thickness increase of the battery was in proportion to the amount of gas generated in the battery, and in the lithium secondary battery of the present invention, the amount of gas generated after storage at a high-temperature for 1 week was similar to or somewhat lower than that in the lithium secondary battery of the comparative example, but was significantly reduced after 8 weeks as compared with the comparative example, which showed that the thickness increase rate was significantly reduced.

Meanwhile, it could be confirmed that in a case where —OPF$_2$ was present at each of both ends of one molecule as in Comparative Examples 2 and 3, both of two —OPF$_2$s present in one molecule further strongly coordinated to a transition metal of the cathode to increase the discharge DCIR of the secondary battery, whereas, in a case where only one —OPF$_2$ was present in one molecule as in the present invention, the discharge DCIR was reduced due to the optimized binding force with the transition metal of the cathode.

As described above, it can be appreciated that the lithium secondary battery employing the electrolytic solution for a lithium secondary battery of the present invention containing the difluorophosphite compound which is a specific additive, has very excellent stability at a high temperature due to a reduced discharge DCIR in accordance with not only a significantly low thickness increase rate at a high temperature but also the optimized binding force with the transition metal of the cathode.

In addition, it can be appreciated that the electrolytic solution for a secondary battery of the present invention containing the difluorophosphite compound which is a specific additive further contains PS, LiBOB, and ESA, as an additional additive, such that the battery has further improved high-temperature storage stability. That is, it could be appreciated that in the lithium secondary battery of the present invention, the amount of gas generated after storage at a high-temperature for 1 week was significantly small as compared to that in the lithium secondary battery of the comparative example, and the amount of gas generated was significantly small even after 8 weeks, which showed that the thickness increase of the battery was also very low.

Accordingly, it could be appreciated that in the lithium secondary battery employing the electrolytic solution for a secondary battery of the present invention containing the difluorophosphite compound which was a specific additive, and PS, LiBOB, and ESA, as an additional additive, the thickness change was not large due to a very small amount of gas generated even after being left at 60° C. for 8 weeks, and stability at a high temperature was very excellent due to a reduced discharge DCIR in accordance with the optimized binding force with the transitional metal of the cathode.

Examples 13 to 18 and Comparative Examples 4 and 5

A solution obtained by dissolving LiPF$_6$ in a mixed solvent in which ethylene carbonate (EC), ethyl methyl carbonate (EMC), and diethyl carbonate (DEC) were mixed with each other at a volume ratio of 25:45:30 so as to have a 1.0 M solution was used as a base electrolytic solution (1.0 M LiPF$_6$, EC/EMC/DEC=25:45:30), and components shown in Table 2 were additionally added to the base electrolytic solution, thereby preparing an electrolytic solution.

A battery to which the non-aqueous electrolytic solution was applied was prepared as follows.

LiNi$_{0.8}$Co$_{0.1}$Mn$_{0.1}$O$_2$ was used as a cathode active material, polyvinylidene fluoride (PVdF) was used as a binder, and carbon was used as a conductive material. The cathode active material, the binder, and the conductive material were mixed with each other at a weight ratio of 92:4:4, and then the mixture was dispersed in N-methyl-2-pyrrolidone, thereby preparing a cathode slurry. The slurry was coated on an aluminum foil having a thickness of 20 μm, dried, and rolled, thereby preparing a cathode. Artificial graphite and natural graphite were mixed with each other at a ratio of 7:3 and the mixture was used as an anode active material, styrene-butadiene rubber was used as a binder, and carboxymethyl cellulose was used as a thickener. The anode active material, the binder, and the thickener were mixed with each other at a weight ratio of 96:2:2, and the mixture was dispersed in water, thereby preparing an anode active material slurry. The slurry was coated on a copper foil having a thickness of 15 μm, dried, and rolled, thereby preparing an anode.

A film separator formed of a polyethylene (PE) material and having a thickness of 25 μm was stacked between the prepared electrodes, a cell was configured using a pouch having a size of thickness 8 mm×length 60 mm×width 90 mm, and the non-aqueous electrolytic solution was injected to the pouch, thereby producing a 20 Ah-class lithium secondary battery.

Performance of the 20 Ah-class lithium secondary battery produced as described above was evaluated as follows. The results are shown in Table 2.

1. Capacity retention ratio at 60° C. after 8 weeks: After the battery was left at 60° C. for 8 weeks, the battery was left at room temperature for 30 minutes and was subjected to IR measurement, and a capacity obtained by CC-discharging (2.7 V cut-off) the battery at 1C rate was divided by a capacity measured before the storage and was calculated as a percentage.

Capacity retention rate (%) of battery=(final capacity/initial capacity)×100 (%)

2. Amount of gas generated at 60° C. after 1 week: The battery was left at 60° C. for 1 week and left at room temperature for 30 minutes, and then the battery was placed in a chamber for measuring the amount of gas generated. The chamber was placed under vacuum and was filled with nitrogen gas to normal pressure. At this time, a nitrogen volume ($V_0$) and a chamber internal pressure ($P_0$) were measured. The chamber was placed under vacuum again and a hole was made in the battery to measure a chamber internal pressure ($P_1$).

Amount of gas generated (mL)=$V_0/P_0*P_1$

3. HPPC Discharge

1) DCIR: A hybrid pulse power characterization (HPPC) test was carried out to measure resistance of the produced lithium secondary battery. The batteries were completely charged (SOC=100) up to 4.2 V with 0.5 C (10 A), then discharged from SOC 100 to 10, and each of the batteries was stabilized for 1 hour. Then, discharge resistance of each lithium secondary battery was measured in each SOC stage by an HPPC test method.

2) Power [W/kg] @ SOC 50%: Power characteristics of the produced lithium secondary battery at room temperature was measured under a 10s HPPC condition of SOC 50%. That is, relative resistance was measured under a condition of 3 cycles×(CC discharge→rest for 20 min→CC/CV charge)→rest for 30 min→9 cycles×(CC discharge at SOC 10%→rest for 1 hr→10C discharge for 10s→rest for 30 min→10C charge for 10s→rest for 30 min), and then relative power was measured according to the following power calculation formula under SOC 50%.

Power calculation formula=$OCV_{SOC50\%} \times (OCV_{SOC50\%} - V_{min})/R_{SOC50\%}$

TABLE 2

|  | Composition of electrolytic solution | High-temperature store at 60° C. | | HPPC discharge | |
|---|---|---|---|---|---|
|  |  | 8 weeks | 1 week | | |
|  |  | Capacity retention rate [%] | Amount of gas generated [mL] | DCIR [mΩ] | Power [W/kg] @ SOC50% |
| Example 13 | Base electrolytic solution + PDFP 1.0 wt % | 64.6 | 166.5 | 4.94 | 2,519 |
| Example 14 | Base electrolytic solution + ODFP 1.0 wt % | 62.9 | 169.8 | 4.94 | 2,496 |
| Example 15 | Base electrolytic solution + EEEDFP 1.0 wt % | 62.0 | 171.5 | 4.98 | 2,472 |
| Example 16 | Base electrolytic solution + CEDFP 1.0 wt % | 58.8 | 182.5 | 5.16 | 2,399 |
| Example 17 | Base electrolytic solution + CHDFP 1.0 wt % | 59.9 | 179.1 | 5.11 | 2,412 |
| Example 18 | Base electrolytic solution + PDFP 1.0 wt % + PS 0.5 wt % + LiBOB 0.5 wt % + ESA 0.5 wt % | 81.7 | 104.6 | 4.30 | 2,757 |

TABLE 2-continued

|  | Composition of electrolytic solution | High-temperature store at 60° C. | | HPPC discharge | |
|---|---|---|---|---|---|
|  |  | 8 weeks Capacity retention rate [%] | 1 week Amount of gas generated [mL] | DCIR [mΩ] | Power [W/kg] @ SOC50% |
| Comparative Example 4 | Base electrolytic solution | 52.6 | 204.8 | 5.06 | 2,422 |
| Comparative Example 5 | Base electrolytic solution + BDFPOE 1.0 wt % | 58.6 | 198.8 | 5.18 | 2,390 |

Base electrolytic solution: 1.0 M LiPF$_4$, EC/EMC/DEC = 25:45:30

PDPF:  (Example 1)

ODFP:  (Example 2)

EEEDFP:  (Example 3)

CEDFP:  (Example 4)

CHDFP: 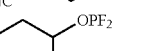 (Example 5)

BDFPOE: 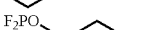 (Comparative Preparation Example 1)

PS: 1,3-propane Sultone
LiBOB: lithium bis(oxalato)borate
ESA: ethylene sulfate

As seen from Table 2, it could be confirmed that in the lithium secondary battery of the example containing the non-aqueous electrolytic solution of the present invention including the difluorophosphite compound as an additive, the capacity retention rate was high even after being left at a high temperature for 8 weeks as compared to that in the lithium secondary battery of the comparative example in which the additive was not included, and the discharge resistance was low under the HPCC discharge condition, and the power characteristics at room temperature were excellent. In particular, in Examples 13 to 15, and 17, during high-temperature storage, the capacity retention rate was further improved, the discharge resistance was further reduced under the HPPC discharge condition, and the power characteristics at room temperature was improved, as compared to those in Comparative Example 5.

In addition, in the lithium secondary battery of the example containing the non-aqueous electrolytic solution of the present invention including the difluorophosphite compound as an additive, the amount of gas generated at a high-temperature storage was reduced as compared to that in the lithium secondary battery of the comparative example in which the additive was not included.

As described above, it can be appreciated that the lithium secondary battery employing the electrolytic solution for a lithium secondary battery of the present invention containing the difluorophosphite compound which is a specific additive, has not only high capacity retention rate at a high temperature and a small amount of gas generated, but also a reduced discharge DCIR under the HPPC discharge condition and improved power characteristics, such that the battery has very excellent stability at a high temperature and has improved power performance at room temperature.

In addition, it can be appreciated that the electrolytic solution for a secondary battery of the present invention containing the difluorophosphite compound which is a specific additive further contains PS, LiBOB, and ESA, as an additional additive, such that the battery has further improved high-temperature storage stability and power performance at room temperature.

That is, it can be appreciated that the lithium secondary battery employing the electrolytic solution for a lithium secondary battery of the present invention containing the difluorophosphite compound which is a specific additive and PS, LiBOB, and ESA as an additional additive, has not only high capacity retention rate even after being left at 60° C. for 8 weeks, but also a reduced discharge DCIR under the HPPC discharge condition and improved power characteristics, such that the battery has very excellent stability at a high temperature and has improved power performance at room temperature.

[Examples 19 to 29 and Comparative Examples 6 to 12] Production of Lithium Secondary Battery A solution obtained by dissolving LiPF$_6$ in a mixed solvent in which ethylene carbonate (EC), ethyl methyl carbonate (EMC), and diethyl carbonate (DEC) were mixed with each other at a volume ratio of 25:45:30 so as to have 1.0 M was used as a base electrolytic solution (1.0 M LiPF$_6$, EC/EMC/DEC=25:45:30), and components shown in Table 3 were additionally added to the base electrolytic solution, thereby preparing an electrolytic solution.

A battery to which the non-aqueous electrolytic solution was applied was prepared as follows.

LiNi$_a$Co$_b$Mn$_c$O$_2$ (0<a<1, 0<b<1, 0<c<1, and a+b+c=1) was used as a cathode active material, polyvinylidene fluoride (PVdF) was used as binder, and carbon was used as a conductive material. The cathode active material, the binder, and the conductive material were mixed with each other at a weight ratio of 92:4:4, and then the mixture was dispersed in N-methyl-2-pyrrolidone, thereby preparing a cathode slurry. The slurry was coated on an aluminum foil having a thickness of 20 μm, dried, and rolled, thereby preparing a cathode. Artificial graphite was used as an anode active material, styrene-butadiene rubber was used as a binder, and carboxymethyl cellulose was used as a thickener. The anode active material, the binder, and the thickener were mixed with each other at a weight ratio of 96:2:2, and the mixture was dispersed in water, thereby preparing an anode active material slurry. The slurry was coated on a copper foil having a thickness of 15 μm, dried, and rolled, thereby preparing an anode.

A film separator formed of a polyethylene (PE) material and having a thickness of 25 μm was stacked between the prepared electrodes, a cell was configured using a pouch having a size of thickness 8 mm×length 60 mm×width 90 mm, and the non-aqueous electrolytic solution was injected to the pouch, thereby producing a 1.7 Ah-class lithium secondary battery.

Performance of the 1.7 Ah-class lithium secondary battery produced as described above was evaluated as follows. The results are shown in Table 3. Evaluation items are as follows.

*Evaluation Items*

1. Lifespan at room temperature: A process of charging the battery at room temperature to 4.35 V (or 4.20 V) with 1.7 A CC-CV for 3 hours and discharging to 2.7 V with a current of 1.7 A up to 2.7 V was repeated 500 times. In this case, discharge capacity at the first cycle was defined as C, and discharge capacity at the 500th cycle was divided by the discharge capacity at the first cycle, thereby calculating a capacity retention rate during the lifespan.

2. Thickness increase rate at 60° C. after 30 days (or 56 days): When, after the battery was charged to 4.35 V (or 4.20 V) with 1.7 A CC-CV at room temperature for 3 hours, a thickness of the charged battery was defined as A, and a thickness of the battery left at 60° C. and normal pressure exposed to atmosphere for 30 days (or 56 days) using a sealed thermostatic device was defined as B, a thickness increase rate was calculated by the following Expression 1. The thickness of the cell was measured using a flat plate thickness measuring device (543-490B, manufactured by Mitutoyo Corporation).

$$(B-A)/A \times 100(\%) \qquad \text{[Expression 1]}$$

3. Discharge DCIR at 60° C. after 56 days: After the cell was left in a chamber of 60° C. at a high temperature for 56 days, C-rates were sequentially increased to 0.2 C, 0.5 C, 1.0 C, 1.5 C, 2.0 C, 2.5 C, and 3.0 C at a point of time when SOC of the cell was set to 60%, a termination point of a voltage when charge and discharge at the corresponding C-rate were performed for 10 seconds was configured as a straight linear equation, and a slope thereof was adopted as DCIR.

4. Amount of gas generated at 60° C. after 1 week: The battery was left at 60° C. for 1 week and left at room temperature for 30 minutes, and then the battery was placed in a chamber for measuring the amount of gas generated. The chamber was placed under vacuum and was filled with nitrogen gas to normal pressure. At this time, a nitrogen volume ($V_0$) and a chamber internal pressure ($P_0$) were measured. The chamber was placed under vacuum again and a hole was made in the battery to measure a chamber internal pressure ($P_1$).

Amount of gas generated (mL)=$V_0/P_0*P_1$

TABLE 3

| | Composition of electrolytic solution | Cathode active material $LiNi_aCo_bMn_cO_2$ a:b:c | Voltage (V) | Lifespan at room temperature Capacity retention rate [%] during lifespan | 60° After 30 days Thickness increase rate [%] | After 56 days Thickness increase rate [%] | After 56 days Discharge DCIR [mΩ] | After 7 days Amount of gas generated [mL] |
|---|---|---|---|---|---|---|---|---|
| Example 19 | Base electrolytic solution + PDFP 1.0 wt % | 0.6:0.2:0.2 | 4.35 | 76.7 | 53 | 91 | 100.3 | 9.16 |
| Example 20 | Base electrolytic solution + PDFP 1.0 wt % | 0.6:0.2:0.2 | 4.20 | 78.1 | 50 | 61 | 91.6 | 4.78 |
| Example 21 | Base electrolytic solution + PDFP 1.0 wt % + LiDFBOP 1.0 wt % | 0.6:0.2:0.2 | 4.35 | 83.2 | 37 | 79 | 108.6 | 6.20 |
| Example 22 | Base electrolytic solution + PDFP 1.0 wt % + LiBOB 1.0 wt % | 0.6:0.2:0.2 | 4.35 | 79.3 | 40 | 86 | 106.3 | 6.11 |
| Example 23 | Base electrolytic solution + PDFP 1.0 wt % + PS 1.0 wt % | 0.6:0.2:0.2 | 4.35 | 78.6 | 35 | 70 | 109.1 | 5.71 |
| Example 24 | Base electrolytic solution + PDFP 1.0 wt % + LiDFBOP 1.0 wt % + LiBOB 1.0 wt % | 0.6:0.2:0.2 | 4.35 | 86.6 | 26 | 68 | 104.4 | 5.70 |

TABLE 3-continued

| | Composition of electrolytic solution | Cathode active material $LiNi_aCo_bMn_cO_2$ a:b:c | Voltage (V) | Lifespan at room temperature Capacity retention rate [%] during lifespan | 60° | | | After 7 days Amount of gas generated [mL] |
|---|---|---|---|---|---|---|---|---|
| | | | | | After 30 days Thickness increase rate [%] | After 56 days | | |
| | | | | | | Thickness increase rate [%] | Discharge DCIR [mΩ] | |
| Example 25 | Base electrolytic solution + PDFP 1.0 wt % + LiDFBOP 1.0 wt % + PS 1.0 wt % | 0.6:0.2:0.2 | 4.35 | 86.4 | 18 | 63 | 105.3 | 5.48 |
| Example 26 | Base electrolytic solution + PDFP 1.0 wt % + LiDFBOP 1.0 wt % + LiBOB 1.0 wt % + PS 1.0 wt % | 0.6:0.2:0.2 | 4.2 | 90.1 | 1 | 2 | 57.9 | 4.27 |
| Example 27 | Base electrolytic solution + PDFP 1.0 wt % + LiDFBOP 1.0 wt % + LiBOB 1.0 wt % + PS 1.0 wt % | 0.6:0.2:0.2 | 4.35 | 89.6 | 5 | 53 | 87.0 | 4.65 |
| Example 28 | Base electrolytic solution + PFDP 1.0 wt % + LiDFBOP 1.0 wt % + LiBOB 1.0 wt % + PS 1.0 wt % | 0.5:0.2:0.3 | 4.35 | 88.4 | 5 | 56 | 94.5 | 4.88 |
| Example 29 | Base electrolytic solution + PDFP 1.0 wt % + LiDFBOP 1.0 wt % + LiBOB 1.0 wt % + PS 1.0 wt % | 1/3:1/3:1/3 | 4.35 | 87.0 | 9 | 60 | 99.6 | 5.11 |
| Comparative Example 6 | Base electrolytic solution | 0.6:0.2:0.2 | 4.35 | 71.0 | 121 | 167 | 288.2 | 29.30 |
| Comparative Example 7 | Base electrolytic solution | 0.6:0.2:0.2 | 4.20 | 70.0 | 108 | 120 | 171.0 | 27.10 |
| Comparative Example 8 | Base electrolytic solution | 0.6:0.2:0.3 | 4.35 | 72.0 | 71 | 159 | 237.9 | 25.60 |
| Comparative Example 9 | Base electrolytic solution + LiDFBOP 1.0 wt % | 0.6:0.2:0.2 | 4.35 | 78.7 | 117 | 178 | 263.9 | 27.30 |
| Comparative Example 10 | Base electrolytic solution + LiDFBOP 1.0 wt % + LiBOB 1.0 wt % + PS 1.0 wt % | 0.6:0.2:0.2 | 4.35 | 80.3 | 98 | 117 | 120.4 | 25.30 |
| Comparative Example 11 | Base electrolytic solution + BDFPOE 1.0 wt % | 0.6:0.2:0.2 | 4.35 | 80.3 | 45 | 107 | 15.6 | 9.90 |

TABLE 3-continued

| | Composition of electrolytic solution | Cathode active material LiNi$_a$Co$_b$Mn$_c$O$_2$ a:b:c | Voltage (V) | Lifespan at room temperature Capacity retention rate [%] during lifespan | 60° After 30 days Thickness increase rate [%] | After 56 days Thickness increase rate [%] | Discharge DCIR [mΩ] | After 7 days Amount of gas generated [mL] |
|---|---|---|---|---|---|---|---|---|
| Comparative Example 12 | Base electrolytic solution + BDFPOE 1.5 wt % | 0.6:0.2:0.2 | 4.35 | 80.8 | 46 | 99 | 114.4 | 10.10 |

Base electrolytic solution: 1 M LiPF$_6$, EC/EMC/DEC = 25:45:30

PDPF:  (Example 1)

BDFPOE:  (Comparative Preparation Example 1)

LiDFBOP: lithium difluoro bis(oxalato)phosphate
LiBOB: lithium bis(oxalato)borate
PS: 1,3-propane Sultone As seen from Table 3, it could be appreciated that in each of the lithium secondary batteries of Examples 19 to 29 employing the electrolytic solution for a lithium secondary battery of the present invention containing the difluorophosphite compound which was a specific additive, long-term stability was very high at a high temperature due to a low thickness increase rate at 60° C. after 56 days, and stability at a high temperature was very excellent due to a discharge DCIR reduced by the optimized binding force with the transition metal of the cathode in accordance with the difluorophosphite compound in which only one —OPF$_2$ was present in one molecule.

On the other hand, it could be confirmed that in the case of Comparative Examples 11 and 12 including BDFPOE in which —OPF$_2$ was present at each of both ends, high-temperature stability was somewhat excellent until 30 days, but the high-temperature stability was reduced over a long period of time after 56 days, and both two —OPF$_2$s present in one molecule strongly coordinated to the transition metal of the cathode to increase the discharge DCIR of the secondary battery.

It can also be appreciated that the electrolytic solution for a secondary battery of the present invention containing the difluorophosphite compound which is a specific additive further contains one or more additives selected from LiBOB, LiDFBOP, and PS as an additional additive, such that the battery has further improved high-temperature storage long-term stability.

In particular, it can be appreciated that, by the combination of the electrolytic solution for a secondary battery of the present invention containing both the difluorophosphite compound which is a specific additive and LiBOB, LiDF-BOP, and PS, as an additional additive, and the cathode active material having a specific composition, the battery has further improved high-temperature stability under a high voltage of 4.20 V or more based on a cathode potential, that is, the battery has the long-term stability at a high temperature.

INDUSTRIAL APPLICABILITY

The electrolytic solution for a lithium secondary battery of the present invention contains the difluorophosphite compound, such that power of the battery does not deteriorate even under a high voltage, and the battery has excellent lifespan characteristics and also has very excellent high-temperature characteristics.

Further, the electrolytic solution for a lithium secondary battery according to the present invention contains the difluorophosphite compound, such that the battery is very excellent not only in a capacity recovery rate but also in high-temperature storage stability at a high temperature, and power characteristics of the battery are also improved.

Further, the lithium secondary battery of the present invention employs the electrolytic solution for a lithium secondary battery of the present invention containing the difluorophosphite compound, such that the battery has excellent high-temperature storage stability while maintaining excellent basic performances such as high-rate charge and discharge characteristics and lifespan characteristics.

Further, the lithium secondary battery of the present invention employs the electrolytic solution for a lithium secondary battery of the present invention containing the difluorophosphite compound, such that a thickness change of the battery is small even after long-term storage at a high temperature, and thus, the battery has significantly excellent high-temperature stability.

Further, the lithium secondary battery of the present invention employs the electrolytic solution for a lithium secondary battery of the present invention containing the difluorophosphite compound, such that internal resistance of the battery is reduced, and thus, the battery has further improved power characteristics.

Further, the lithium secondary battery of the present invention employs the electrolytic solution for a lithium secondary battery of the present invention containing the difluorophosphite compound capable of suppressing a side reaction of the electrolytic solution at a high-temperature and high-voltage environment, such that cycle characteristics and stability of the battery may be improved even when charging at a high temperature and a high voltage.

The invention claimed is:

1. An electrolytic solution for a secondary battery, comprising:
   a lithium salt;
   a non-aqueous organic solvent; and
   a difluorophosphite compound of the following Formula 1:

$A\text{-OPF}_2$  [Formula 1]

in Formula 1,
   A is a substituted or unsubstituted C1-C10 alkyl or C3-C10 cycloalkyl,
   wherein the substituted C1-C10 alkyl and C3-C10 cycloalkyl are substituted with C1-C10 alkoxy or C1-C10 alkoxy-C1-C10 alkoxy.

2. The electrolytic solution of claim 1, wherein in Formula 1, A is C2-C8 alkyl, C2-C8 alkyl substituted with H—(CH$_2$CH$_2$O)$_m$—, or C3-C7 cycloalkyl, and
   m is an integer of 1 or 2.

3. The electrolytic solution of claim 1, wherein the difluorophosphite compound of Formula 1 is represented by the following Formula 2,

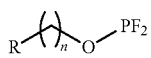   [Formula 2]

in Formula 2,
   R is hydrogen or H—(CH$_2$CH$_2$O)$_m$—,
   n is an integer of 2 to 8, and m is an integer of 1 or 2.

4. The electrolytic solution of claim 1, wherein the difluorophosphite compound of Formula 1 is represented by the following Formula 3,

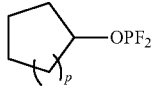   [Formula 3]

in Formula 3,
   p is an integer of 1 to 3.

5. The electrolytic solution of claim 1, wherein the difluorophosphite compound is one or more selected from the following compounds.

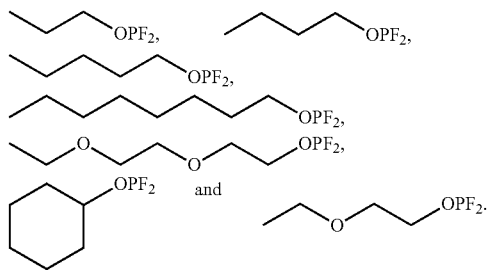

6. The electrolytic solution of claim 1, wherein the difluorophosphite compound is contained in an amount of 0.1 to 5 wt % with respect to a total weight of the electrolytic solution.

7. The electrolytic solution of claim 1, further comprising one or two or more additional additives selected from 1,3-propane sultone (PS), lithium bis(oxalato)borate (Li-BOB), lithium difluoro bis(oxalato)phosphate (LiDFBOP), and ethylene sulfate (ESA).

8. The electrolytic solution of claim 7, wherein the additional additive is contained in an amount of 0.1 to 10.0 wt % with respect to a total weight of the electrolytic solution.

9. A lithium secondary battery comprising:
   a cathode containing a nickel-cobalt-manganese-based cathode active material, an anode, a separator interposed between the cathode and the anode, and the electrolytic solution of claim 1.

10. The lithium secondary battery of claim 9, wherein the cathode active material includes $Li_{x1}(Ni_{a1}Co_{b1}Mn_{c1})O_2$, $Li_{x2}(Ni_{a2}Co_{b2}Mn_{c2})O_4$, or a mixture therof where $0.5<x1<1.3$, $0<a1<1$, $0<b1<1$, $0<c1<1$, and $a1+b1+c1=1$; $0.5<x2<1.3$, $0<a2<2$, $0<b2<2$, $0<c2<2$, and $a2+b2+c2=2$).

11. The lithium secondary battery of claim 10, wherein the cathode active material is $Li_{x1}(Ni_{a1}Co_{b1}Mn_{c1})O_2$ where $0.90 \le x1 \le 1.10$, $0.3 \le a1 \le 0.9$, $0.05 \le b1 \le 0.5$, $0.05 \le c1 \le 0.5$, and $a1+b1+c1=1$.

12. The lithium secondary battery of claim 11, wherein the cathode active material is $Li(Ni_{a1}Co_{b1}Mn_{c1})O_2$ where $0.3 \le a1 \le 0.9$, $0.05 \le b1 \le 0.5$, $0.05 \le c1 \le 0.5$, and $a1+b1+c1=1$.

13. A lithium secondary battery comprising:
   a cathode containing a nickel-cobalt-manganese-based cathode active material, an anode, a separator interposed between the cathode and the anode, and the electrolytic solution of claim 1.

* * * * *